United States Patent
Flossmann et al.

(10) Patent No.: US 11,443,431 B2
(45) Date of Patent: Sep. 13, 2022

(54) AUGMENTED REALITY PATIENT POSITIONING USING AN ATLAS

(71) Applicant: Brainlab AG, Munich (DE)

(72) Inventors: Sven Flossmann, Feldkirchen (DE); Samuel Kerschbaumer, Munich (DE); Nils Frielinghaus, Heimstetten (DE); Christoffer Hamilton, Aschheim (DE)

(73) Assignee: Brainlab AG, Munich (DE)

( * ) Notice: Subject to any disclaimer, the term of this patent is extended or adjusted under 35 U.S.C. 154(b) by 0 days.

(21) Appl. No.: 16/478,341

(22) PCT Filed: Mar. 22, 2017

(86) PCT No.: PCT/EP2017/056820
§ 371 (c)(1),
(2) Date: Jul. 16, 2019

(87) PCT Pub. No.: WO2018/171880
PCT Pub. Date: Sep. 27, 2018

(65) Prior Publication Data
US 2019/0378276 A1   Dec. 12, 2019

(51) Int. Cl.
*G06T 7/00*   (2017.01)
*G06T 7/11*   (2017.01)
(Continued)

(52) U.S. Cl.
CPC .............. *G06T 7/0016* (2013.01); *G06T 7/11* (2017.01); *G06T 7/33* (2017.01); *G06T 7/60* (2013.01); *G06T 2210/41* (2013.01)

(58) Field of Classification Search
CPC ....... G06T 2200/04; G06T 2207/10081; G06T 2207/10088; G06T 2207/10132;
(Continued)

(56) References Cited

U.S. PATENT DOCUMENTS

| 10,010,379 B1* | 7/2018 | Gibby | G06T 7/74 |
| 2013/0245461 A1* | 9/2013 | Maier-Hein | A61B 5/742 600/476 |

(Continued)

FOREIGN PATENT DOCUMENTS

| WO | 2016096038 A1 | 6/2016 |
| WO | 2016173626 A1 | 11/2016 |
| WO | 2018171880 A1 | 9/2018 |

OTHER PUBLICATIONS

Linte C A et al. Virtual and Augmented Medical Imaging Environments:Enabling Technology for Minimally Invasive Cardiac Interventional Guidance, IEEE Reviews in Biomedical Engineering, IEEE, USA, vol. 3, Jan. 1, 2010 (Jan. 1, 2010), pp. 25-47, XP011491264, ISSN: 1937-3333,DOI: 10.1109/ RBME.2010.2082522.*

(Continued)

*Primary Examiner* — Christopher S Kelley
*Assistant Examiner* — Ana Picon-Feliciano
(74) *Attorney, Agent, or Firm* — Middleton Reutlinger

(57) ABSTRACT

The disclosed method encompasses using an augmented reality device to blend in augmentation information including for example atlas information. The atlas information may be display separately from or in addition to a patient image (planning image). In order to display the atlas information in a proper position relative to the patient image, data the two data sets are registered to one another. This registration can serve for generating a diversity of atlas-based image supplements, for example alternatively or additionally to the foregoing for displaying a segmentation of the patient image in the augmented reality image. The disclosed method is usable in a medical environment such as for surgery or radiotherapy.

12 Claims, 4 Drawing Sheets

(51) Int. Cl.
*G06T 7/33* (2017.01)
*G06T 7/60* (2017.01)

(58) Field of Classification Search
CPC . G06T 2207/20221; G06T 2207/30016; G06T 2207/30028; G06T 2207/30061; G06T 2207/30092; G06T 2210/41; G06T 7/0016; G06T 7/11; G06T 7/33; G06T 7/344; G06T 7/60
USPC .......................................................... 348/77
See application file for complete search history.

(56) References Cited

U.S. PATENT DOCUMENTS

| 2016/0379504 | A1  | 12/2016 | Bailey et al. |            |
|--------------|-----|---------|---------------|------------|
| 2017/0186157 | A1* | 6/2017  | Boettger      | G06F 3/0346 |
| 2017/0340297 | A1* | 11/2017 | Varkuti       | A61B 6/501 |

OTHER PUBLICATIONS

Talbot et al., An Augmented Reality Application for Patient Positioning and Monitoring in Radiotherapy; https://link.springer.com/chapter/10.1007/978-3-642-03474-9_174 with summary, 2009 (accessed Jul. 16, 2019); 3 pages.

International Search Report and Written Opinion for PCT Application No. PCT/EP2017/056820 dated Sep. 22, 2017.

* cited by examiner

AUGMENTED REALITY PATIENT POSITIONING USING AN ATLAS

The present invention relates to a computer-implemented medical method for generating augmentation information relating to a medical image, using the output of an augmented reality device having an output unit for outputting the augmentation information. The invention also relates to a computer configured to execute a program corresponding to the method and a medical system for generating augmentation information relating to a medical image, using the output of the augmented reality device, the medical system comprising a computer of the aforementioned kind.

TECHNICAL BACKGROUND

By combining pre-operative medical images with other digital patient information such as indication and planned procedure, currently available software can present surgeons with optimal views and optimal view layouts, displaying the required medical imaging information.

As complexity in the OR increases with a larger number of medical devices (e.g. navigation systems, intraoperative imaging and surgical robots) the setup is less uniform for each specialty. The number of possible setups of patient and devices increases and more expertise is required to create the optimal setup in the OR. Current solutions such as pre-defined setups (procedure cards) are not sufficient for all future combinations.

This leads to an increase in incorrect setups and more time spent by surgeons prior to the start of the procedure correcting the setup, including patient positioning and position of medical devices. Shortage of experienced OR nurses leads to valuable surgeon time spent explaining the optimal setup to supporting staff in the OR.

The disclosed method enables surgical procedures to be performed more efficiently through more detailed and better planning of the patient setup prior to the start of the surgical procedure. The disclosed method combines medical images, anatomical atlas and digital patient information to create and suggest optimal setups for visualization through an augmented reality device.

EXEMPLARY SHORT DESCRIPTION OF THE PRESENT INVENTION

In the following, a short description of the specific features of the present invention is given which shall not be understood to limit the invention only to the features or a combination of the features described in this section.

The disclosed method encompasses using an augmented reality device to blend in augmentation information including for example atlas information. The atlas information may be display separately from or in addition to a patient image (planning image). In order to display the atlas information in a proper position relative to the patient image, the two data sets are registered to one another. This registration can serve for generating a diversity of atlas-based image supplements, for example alternatively or additionally to the foregoing for displaying a segmentation of the patient image in the augmented reality image. The disclosed method is usable in a medical environment such as for surgery or radiotherapy.

GENERAL DESCRIPTION OF THE PRESENT INVENTION

In this section, a description of the general features of the present invention is given for example by referring to possible embodiments of the invention.

In general, the invention reaches the aforementioned object by providing, in a first aspect, a computer-implemented medical method for generating augmentation information relating to a medical image, using the output of an augmented reality device having an output unit for outputting the augmentation information.

Augmented reality (AR) is a live direct or indirect view of a physical, real-world environment whose elements are augmented (or supplemented) by computer-generated sensory input such as sound, video, graphics or GPS data.

For example, the output unit of the augmented reality device comprises a display of the augmented reality device comprising a head-mounted display (a head-mounted display unit). Specifically, the display of the augmented reality device may be included in glasses (eyeglasses) wearable by a user. A head-mounted display (HMD) is a display device paired to the forehead such as a harness or helmet. The HMD places an image of both the physical world and virtual objects over the user's field of view. The HMD may employ sensors for six degrees of freedom monitoring that allow the system to align virtual information (the augmentation information) to the physical world and adjust accordingly with the user's head movements. Alternatively, the display of the augmented reality device can be rendered on a device resembling eyeglasses. Versions include eyewear that employ cameras to intercept the real world view and re-display its augmented view through the eye piece and devices in which the AR imagery is projected through or reflected off the surfaces of the eyewear lens pieces. Alternatively, the augmented reality device may be embodied by a head-up display which can show data, information, and images while the user views the real world.

The augmented reality device is for example configured to display visual information on its display, for example to display the augmentation information as visual information as an overlay to a real image or other image data acquired with the augmented reality device. For example, the output unit can be configured to output the patient image and to output the augmentation information simultaneously with the patient image (e.g. in a non-overlapping manner or in an at least partly overlapping manner as an overlay on the patient image). A real image is understood to be an image describing the physical scene in the field of view of the augmented reality device. To that end, the augmented reality device comprises an output unit such as a display (display unit) or a projector unit. The display of the augmented reality device may be an entirely digital display (for example, a monitor or a screen upon which a digital image is projected), or an optical display, for example a transparent (e.g. glass or plastic) screen which is transparent for a user to view the real image and may additionally serve as a projection screen for projecting digitally generated information onto, for example as augmentation information for augmenting the information content of the real image. The augmentation information may thus be displayed as an overlay on the real image. Alternatively, the real image may be acquired digitally and rendered on a digital display of the augmented reality device, and the augmentation information may be displayed together (for example, simultaneously) with the digitally rendered real image.

The augmented reality device in one example comprises a distance measurement unit for measuring a distance (also called depth) between the augmented reality device and a specific object which is for example located in the field of view of the augmented reality device. The distance is defined for example as a vector in two or three dimensions. The distance measurement unit for example functions on the principle of measuring distance by detecting light reflections of measurement light from a surface of a real object to at least one light sensor included in the augmented reality device. For example, the distance measurement unit has at least one detecting unit (such as a CCD sensor) for detecting reflections of the measurement light from the physical object. Additionally, the distance measurement unit may have at least one light source for emitting measurement light onto the physical object. Alternatively or additionally, the measurement light may be emitted by an external light source which is not part auf the augmented reality device. The measurement light may be in the visible or infrared wavelength range. The distance is measured based on the principle of triangulation (using for example two stereoscopic detecting units) or time-of-flight (using for example at least one—for example only one—detecting unit).

The method according to the first aspect is for example a data processing method. The method according to the first aspect comprises executing, on at least one processor of at least one computer, the following exemplary steps which are executed by the at least one processor. The at least one computer may be a part of the augmented reality device and/or may be exterior to the augmented reality device while being operably connected to the augmented reality device for exchanging digital data with the augmented reality device (for example, with a digital processor included in the augmented reality device), for example by a wireless connection vie Bluetooth, near field communication or WiFi.

In a (for example first) exemplary step, patient medical image data is acquired which describes a patient image of an anatomical body part of a patient. The patient image is for example a three-dimensional data set taken with a tomographic imaging modality such as computed x-ray tomography or magnetic resonance tomography or ultrasound tomography. The patient medical image data has in one example been generated before execution of the disclosed method starts, but in another example may be generated during execution of the disclosed method. The anatomical body part may be any body part, including soft or bony tissue or cartilage. For example, the anatomical body part is a part of the head (such as at least part of the brain) or a part of the thorax (such as at least part of the rib cage) or a part of the lung or an intestine such as the stomach.

In a further (for example second) exemplary step, geometric model data is acquired which describes a geometric model (for example, a surface model or a volumetric model) of at least part of the patient's body. In one general example, wherein the geometric model is an image-based model, i.e. has been generated on the basis of (for example, from) medical image data. In one more specific example of this step, the geometric model data is acquired from atlas data, for example image-based atlas data, describing the at least part of the patient's body or from a generic geometric model of the at least part of the patient's body, or from an individual synthetic template describing a synthesized geometric model of the at least part of the patient's body. In one example, the geometric model comprises a model of at last part of the anatomical body part. In another example, the geometric model does at least substantially not comprise a model of the anatomical body part, i.e. the geometric model describes a model of other body parts than the anatomical body part of the patient.

In a (for example third) exemplary step, the patient image is registered with the geometric model. Registering the patient image with the geometric model encompasses establishing a spatial relationship between the two data sets, for example by computing a positional transformation (such as a transformation of bases) between the two data sets, specifically between coordinate system used for defining positional information contained in the data sets. For example, the patient image is registered with the geometric model by establishing a positional mapping (a positional transformation which may be defined by a mapping matrix) between a patient image coordinate system in which image coordinates of the patient image are defined and a model coordinate system in which positions of the geometric model are defined, for example by applying a rigid or elastic image fusion algorithm to the patient image and the geometric model.

In a (for example fourth) exemplary step, augmentation information is determined and output using the output unit of the augmented reality device. The augmentation information is determined based on a result of registering the patient image with the geometric model. For example, the augmentation information supplements the patient image with image information acquired from the geometric model data. The augmentation information may be visually output as image data by the output unit. The patient image may also be visually output be the output unit. The augmentation information may be output simultaneously with the patient image. Alternatively, the augmentation information may be output without outputting the patient image by the output unit. The augmentation information may be output as image information overlapping the position of the patient image (for example, the patient image itself if it is simultaneously output) at least partly, or as image information not overlapping the position of the patient image (for example, the patient image itself if it is simultaneously output). In one example, the augmentation information describes at least part of a geometric model of at least part of the anatomical body part. In an alternative example, the augmentation information at least substantially does not describe at least part of a geometric model of at least part of the anatomical body part. In an example, the augmentation information additionally or alternatively includes at least part of the patient image data describing at least part of the patient image.

Within the framework of the above examples, the augmentation information may describe the position of the anatomical body part in the patient image (with or without displaying the patient image partly or in full). This may be achieved by segmenting the patient image using the geometric model. The geometric model may include information about the identity and position of at least one specific anatomical structure (which is a part of the anatomical structure) described by the geometric model and the patient image, and the geometric model may be used to segment the patient image so as to determine the position of that specific structure in the patient image. The augmentation information can then describe for example a visual indication indicating the resulting position of the specific anatomical structure in the patient image.

In one example, at least one of at least the part of the geometric model or at least part of the patient image describing at least part of the anatomical body part is registered, based on a result of a distance measurement by the distance measurement unit of the augmented reality device, with a real image acquired using the augmented reality device. The real image describes a physical structure corresponding to the at least one of the at least part of the geometric model or the at least part of the patient image describing the at least part of the anatomical body part. The physical structure is at least part of a patient's body (such as the anatomical body part) or a shape representative of at least part of a patient's body. The shape representative may be a (tangible) dummy of a whole body of patient (e.g. a standard patient) or only a part of the whole body such as the anatomical body part.

In one example which may be independent of the data processing executed in the first to fourth steps of the method according to the first aspect, the physical structure is positionally tracked using a result of distance measurements by the distance measurement unit of the augmented reality device. In this context, positional tracking means for example acquiring a time series of positions of the physical structure, the position being defined for example in a coordinate system in which positional information included in the augmentation information and/or patient image output by the augmented reality device is defined. The registration between the at least one of at least part of the geometric model or at least part of the anatomical body part with the physical structure is used to determine (for example, change), based on the result of the positional tracking, the position of at least part of the at least one of at least part of the geometric model or at least part of the anatomical body part in a coordinate system used by the augmented reality device to output image information describing the at least one of at least part of the geometric model or at least part of the anatomical body part.

In a variant of this example, the physical structure is positionally tracked using a result of distance measurements by the distance measurement unit of the augmented reality device, and the registration between the at least one of at least part of the geometric model or at least part of the anatomical body part with the physical structure is used to determine, based on the result of the positional tracking, control data for controlling movement of at least part of the physical structure. For example, the registration is used as a basis for determining control data for controlling a motorized moving unit of a patient support device (such as a patient bed) for changing the position of the physical structure, for example to comply with a position of the physical structure defined by the augmentation information.

In a further example, the disclosed method further comprises the following steps and/or features:
medical procedure data is acquired which describes an envisaged medical procedure to be carried out on the patient;
device identity data describing a definition of a medical device is acquired based on the medical procedure data;
augmentation information corresponding to the device identity data is output by the augmented reality device.

The medical procedure data may describe at least one of a medical indication (e.g. pathological state, such as an orthopaedic ailment or tumour disease) or medical procedure (e.g. type of surgery or radiotherapy) or administrative, physiological or anatomical information about the patient (such as at least one of the patient's ethnicity, age or height or other bodily dimension or weight or blood pressure or heart rate). The device identity data may describe for example an identity (e.g. type) or position of a medical device (e.g. instrument such as a Mayfield clamp) to be used. The device identity data is included in the geometric model data or may be acquired separately from the geometric model i.e. in a data set separate from the geometric model data).

In a further example, the disclosed method further comprises the following steps and/or features:
the aforementioned medical procedure data is acquired which describes an envisaged medical procedure to be carried out on the patient;
device control data describing a control parameter of a medical device is acquired based on the medical procedure data;
augmentation information corresponding to the device control data is output by the augmented reality device.

The control parameter may be for example a tightness of a Mayfield clamp which may be determined using a distance measurement of the distance measurement unit to determine a screw position of a tightening screw on the Mayfield clamp, and to compare the resulting screw position to a (previously acquired) predetermined (i.e. at least one of known or fixed) position of the screw. This may be done to determine whether the tightness is in accordance with a predetermined (i.e. at least one of known or fixed) tightness of the screw which may be predetermined from a plan for the envisaged medical procedure (for example considering also the patient administrative data). The device control data may be included in the geometric model data or may be acquired separately from the geometric model data (i.e. in a data set separate from the geometric model data). The augmentation information may then for example constitute a visual indication concerning the result of the comparison (for example, as an e.g. optical output of string defining a numeric value or other indication such as highlighting a screw thread position or any other indication informing the other about the result such as a mere confirmation of a desired screw thread position).

In a further example, the disclosed method further comprises the following steps and/or features:
the aforementioned medical procedure data is acquired which describes an envisaged medical procedure to be carried out on the patient;
device placement data describing a spatial relationship (e.g. at least one of position or orientation) between a medical device (such as an instrument or a table or a Mayfield clamp or a robot and/or articulable arm) and at least part of the patient's body is acquired based on the medical procedure data;
augmentation information (e.g. at least one of a virtual marker or image representation of the device) corresponding to the device placement data (e.g. corresponding to the position of the medical device) is output by the augmented reality device.

The device placement data may be included in the geometric model data or may be acquired separately from the geometric model data i.e. in a data set separate from the geometric model data).

In a second aspect, the invention is directed to a computer program which, when running on at least one processor (for example, a processor) of at least one computer (for example, a computer) or when loaded into at least one memory (for example, a memory) of at least one computer (for example, a computer), causes the at least one computer to perform the above-described method according to the first aspect.

In a third aspect, the invention is directed to a non-transitory computer-readable program storage medium on which the program according to the second aspect is stored.

In a fourth aspect, the invention is directed to at least one computer (for example, a computer), comprising at least one processor (for example, a processor) and at least one memory (for example, a memory), wherein the program according to the second aspect is running on the processor or is loaded into the memory, or wherein the at least one computer is operably coupled to the program storage medium according to the third aspect for executing the program stored on the program storage medium.

In a fifth aspect, the invention is directed to a (physical, for example electrical, for example technically generated) signal wave, for example a digital signal wave, carrying information which represents the program according to the second aspect.

In a sixth aspect, the invention is directed to medical system for generating augmentation information relating to a medical image, the medical system comprising:
a) the at least one computer according to the preceding claim; and
b) the augmented reality device having an output unit for outputting the augmentation information.

The at least one computer may be a part of the augmented reality device and/or may be exterior to the augmented reality device while being operably connected to the augmented reality device for exchanging digital data with the augmented reality device (for example, with a digital processor included in the augmented reality device), for example by a wireless connection vie Bluetooth, near field communication or WiFi. In one example, at least one computer is part of the augmented reality device and executes part of the disclosed method (such as controlling the output unit to output the augmentation information), and at least one other computer is external to the augmented reality device and conducts another part of the disclosed method (such as computing the registration between the patient image and the geometric model), and is operably connected to the augmented reality device to exchange data for performing the method according to the first aspect.

In general, the invention does not involve or for example comprise or encompass an invasive step which would represent a substantial physical interference with the body requiring professional medical expertise to be carried out and entailing a substantial health risk even when carried out with the required professional care and expertise. For example, the invention does not comprise a step of irradiating the anatomical body part and/or the patient's body with ionizing radiation so that it does not comprise any steps of therapy of the human or animal body, for example it does not comprise any step of therapy or surgery. More particularly, the invention does not involve or in particular comprise or encompass any surgical or therapeutic activity. The invention is instead directed as applicable to reading and processing data and operating or controlling a computer to execute a program which causes the computer to perform the data processing method according to the first aspect. For this reason alone, no surgical or therapeutic activity and in particular no surgical or therapeutic step is necessitated or implied by carrying out the invention.

It is within the scope of the present invention to combine one or more features of one or more embodiments or aspects of the invention in order to form a new embodiment wherever this is technically expedient and/or feasible. Specifically, a feature of one embodiment which has the same or a similar function to another feature of another embodiment can be exchanged with said other feature, and a feature of one embodiment which adds an additional function to another embodiment can for example be added to said other embodiment.

Definitions

In this section, definitions for specific terminology used in this disclosure are offered which also form part of the present disclosure.

The method in accordance with the invention is for example a computer implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is an augmented reality device (also referred to as augmented reality glasses) which can be used as "goggles" for navigating. A specific example of such augmented reality glasses is Google Glass (a trademark of Google, Inc.). An augmented reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. The monitor may also be the monitor of a portable, for example handheld, device such as a smart phone or personal digital assistant or digital media player.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

The expression "acquiring data" for example encompasses (within the framework of a computer implemented method) the scenario in which the data are determined by the computer implemented method or program. Determining data for example encompasses measuring physical quantities and transforming the measured values into data, for example digital data, and/or computing the data by means of a computer and for example within the framework of the method in accordance with the invention. The meaning of "acquiring data" also for example encompasses the scenario in which the data are received or retrieved by the computer implemented method or program, for example from another program, a previous method step or a data storage medium, for example for further processing by the computer implemented method or program. Generation of the data to be acquired may but need not be part of the method in accordance with the invention. The expression "acquiring data" can therefore also for example mean waiting to receive data and/or receiving the data. The received data can for example be inputted via an interface. The expression "acquiring data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data acquired by the disclosed method or device, respectively, may be acquired from a database located in a data storage device which is operably to a computer for data transfer between the database and the computer, for example from the database to the computer. The computer acquires the data for use as an input for steps of determining data. The determined data can be output again to the same or another database to be stored for later use. The database or database used for implementing the disclosed method can be located on network data storage device or a network server (for example, a cloud data storage device or a cloud server) or a local data storage device (such as a mass storage device operably connected to at least one computer executing the disclosed method). The data can be made "ready for use" by performing an additional step before the acquiring step. In accordance with this additional step, the data are generated in order to be acquired. The data are for example detected or captured (for example by an analytical device). Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, for example determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

In the field of medicine, imaging methods (also called imaging modalities and/or medical imaging modalities) are used to generate image data (for example, two-dimensional or three-dimensional image data) of anatomical structures (such as soft tissues, bones, organs, etc.) of the human body. The term "medical imaging methods" is understood to mean (advantageously apparatus-based) imaging methods (for example so-called medical imaging modalities and/or radiological imaging methods) such as for instance computed tomography (CT) and cone beam computed tomography (CBCT, such as volumetric CBCT), x-ray tomography, magnetic resonance tomography (MRT or MRI), conventional x-ray, sonography and/or ultrasound examinations, and positron emission tomography. For example, the medical imaging methods are performed by the analytical devices. Examples for medical imaging modalities applied by medical imaging methods are: X-ray radiography, magnetic resonance imaging, medical ultrasonography or ultrasound, endoscopy, elastography, tactile imaging, thermography, medical photography and nuclear medicine functional imaging techniques as positron emission tomography (PET) and Single-photon emission computed tomography (SPECT), as mentioned by Wikipedia. The image data thus generated is also termed "medical imaging data". Analytical devices for example are used to generate the image data in apparatus-based imaging methods. The imaging methods are for example used for medical diagnostics, to analyse the anatomical body in order to generate images which are described by the image data. The imaging methods are also for example used to detect pathological changes in the human body. However, some of the changes in the anatomical structure, such as the pathological changes in the structures (tissue), may not be detectable and for example may not be visible in the images generated by the imaging methods. A tumour represents an example of a change in an anatomical structure. If the tumour grows, it may then be said to represent an expanded anatomical structure. This expanded anatomical structure may not be detectable; for example, only a part of the expanded anatomical structure may be detectable. Primary/high-grade brain tumours are for example usually visible on MRI scans when contrast agents are used to infiltrate the tumour. MRI scans represent an example of an imaging method. In the case of MRI scans of such brain tumours, the signal enhancement in the MRI images (due to the contrast agents infiltrating the tumour) is considered to represent the solid tumour mass. Thus, the tumour is detectable and for example discernible in the image generated by the imaging method. In addition to these tumours, referred to as "enhancing" tumours, it is thought that approximately 10% of brain tumours are not discernible on a scan and are for example not visible to a user looking at the images generated by the imaging method.

In an example, atlas data is acquired which describes (for example defines, more particularly represents and/or is) a general three-dimensional shape of the anatomical body part. The atlas data therefore represents an atlas of the anatomical body part. An atlas typically consists of a plurality of generic models of objects, wherein the generic models of the objects together form a complex structure. For example, the atlas constitutes a statistical model of a patient's body (for example, a part of the body) which has been generated from anatomic information gathered from a plurality of human bodies, for example from medical image data containing images of such human bodies. In principle, the atlas data therefore represents the result of a statistical analysis of such medical image data for a plurality of human bodies. This result can be output as an image—the atlas data therefore contains or is comparable to medical image data. Such a comparison can be carried out for example by applying an image fusion algorithm which conducts an image fusion between the atlas data and the medical image data. The result of the comparison can be a measure of similarity between the atlas data and the medical image data. The atlas data comprises positional information which can be matched (for example by applying an elastic or rigid image fusion algorithm) for example to positional information contained in medical image data so as to for example compare the atlas data to the medical image data in order to determine the position of anatomical structures in the medical image data which correspond to anatomical structures defined by the atlas data.

The human bodies, the anatomy of which serves as an input for generating the atlas data, advantageously share a common feature such as at least one of gender, age, ethnicity, body measurements (e.g. size and/or mass) and pathologic state. The anatomic information describes for example the anatomy of the human bodies and is extracted for example from medical image information about the human bodies. The atlas of a femur, for example, can comprise the head, the neck, the body, the greater trochanter, the lesser trochanter and the lower extremity as objects which together make up the complete structure. The atlas of a brain, for example, can comprise the telencephalon, the cerebellum, the diencephalon, the pons, the mesencephalon and the medulla as the objects which together make up the complex structure. One application of such an atlas is in the segmentation of medical images, in which the atlas is matched to medical image data, and the image data are compared with the matched atlas in order to assign a point (a pixel or voxel) of the image data to an object of the matched atlas, thereby segmenting the image data into objects.

DESCRIPTION OF THE FIGURES

In the following, the invention is described with reference to the appended figures which represent a specific embodiment of the invention. The scope of the invention is however not limited to the specific features disclosed in the context of the figures, wherein

FIG. 1 shows the basic flow of the method according to the first aspect, which starts with a step S11 of acquiring the patient medical image data, followed by a step S12 of acquiring the geometric model data. In subsequent step S13, the patient image is registered with the geometric model, followed by step S14 encompassing output of the augmentation information.

FIG. 2 illustrates a variation of the flow diagram of FIG. 1. Starting with step S21, the patient information (e.g. at least one of the patient medical image data or the patient administrative data or the medical procedure data) is acquired. In subsequent step S22, the geometric model data is acquired by acquiring atlas data which is then used to process (e.g. segment) the patient image. The registration between the atlas and the patient image is established in step S23 which encompasses creation of a virtual space with a patient surface model, a patient support unit (e.g. a table) and medical devices. The registration is then used in step S24 to determine an optimal position of the patient and the medical devices in the virtual space (i.e. in the coordinate system used by the augmented reality device to output image data). Corresponding augmentation information is displayed by the augmented reality device in step S25. The user may then modify in step S26 the position of the patient and/or the medical devices in the virtual space.

FIGS. 3 and 4 illustrate examples of augmentation information. For example, FIG. 3 shows a patient image describing the patient's head 1, combined with a real image of a patient table 2. This image is supplemented by augmentation information describing a head clamp 3. FIG. 4 illustrates augmentation information describing a positional range 5 defining possible desired positions of a medical device on a support rail 6. In this example, the medical device is embodied by an articulable arm 4.

FIG. 5 is a schematic illustration of the medical system 7 according to the sixth aspect. The system comprises an augmented reality device 8 having a digital processor and volatile memory (a computer 9) and an output unit 10 for outputting the augmentation information. The augmented reality device is operably coupled (indicated by the double arrow) to an external computer 11 which is configured to execute a program for conducting at least part of the method according to the first aspect.

Figure 1:
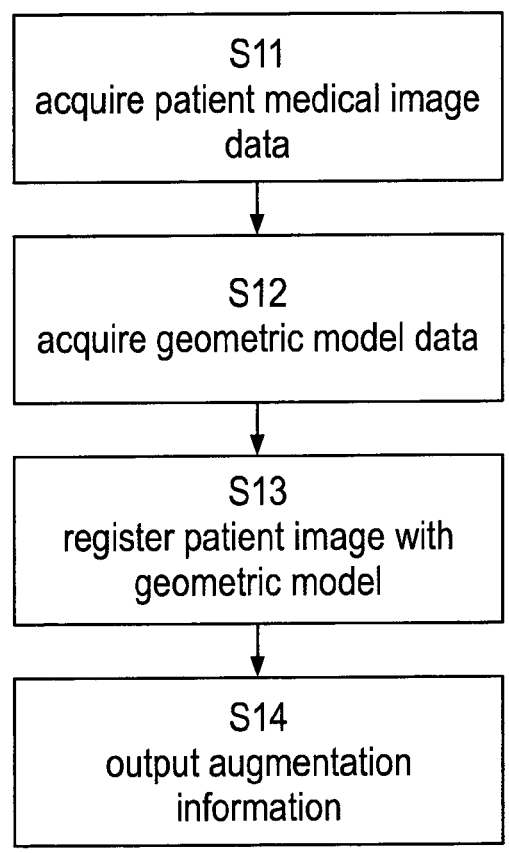
FIG. 1 is a flow diagram illustrating the basic steps of the method according to the first aspect.
Figure 2:
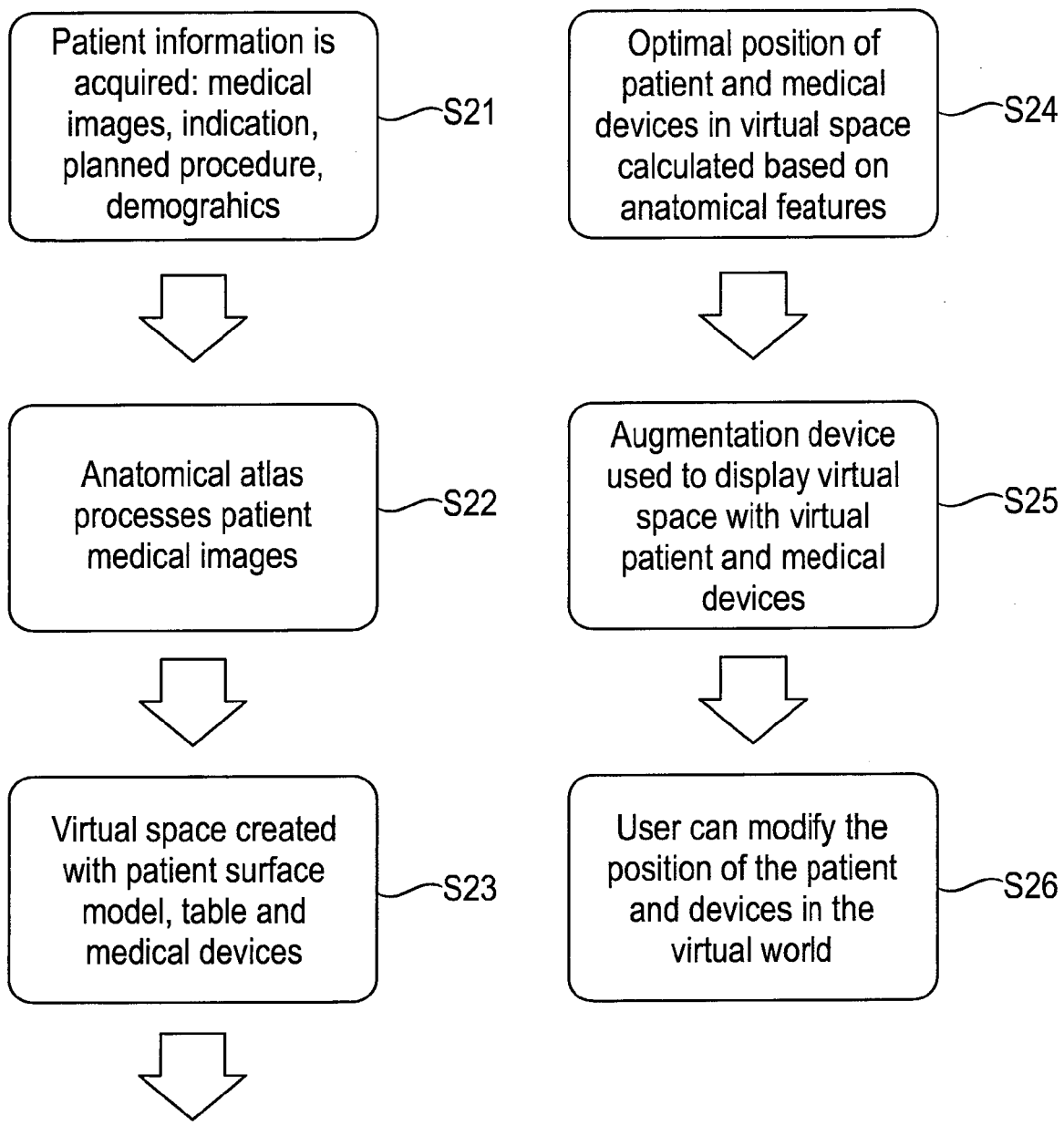
FIG. 2 illustrates a specific variant of the algorithm of FIG. 1.
Figure 3:
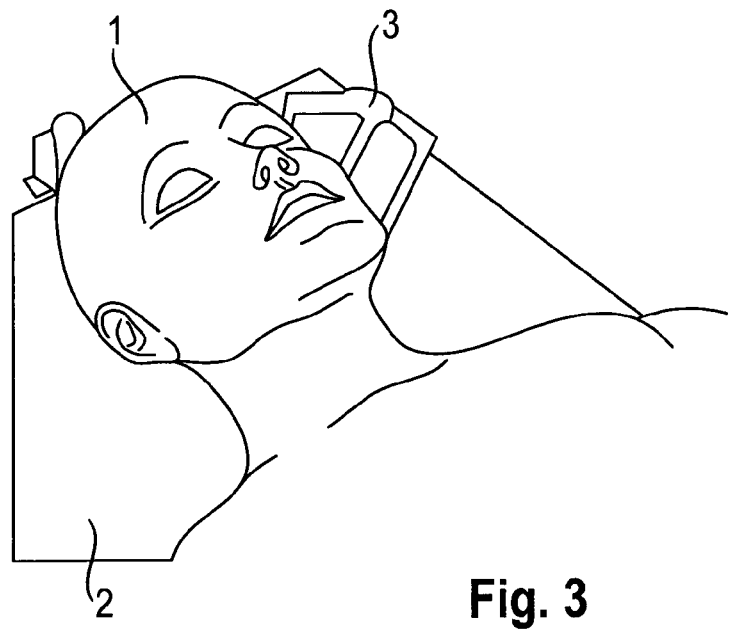
FIGS. 3 to 4 illustrate four examples of augmentation information.
Figure 4:
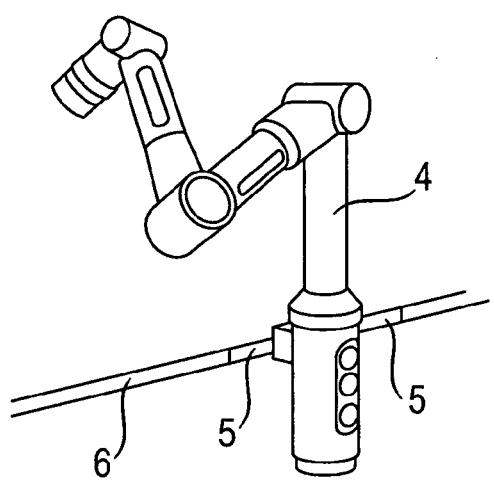
Figure 5:
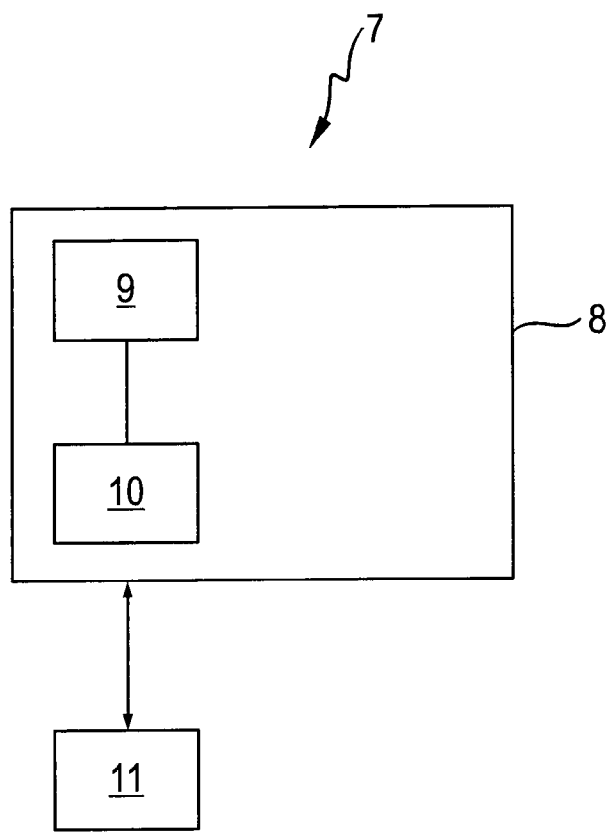
FIG. 5 illustrates the setup of the system according to the sixth aspect.

The method according to the first aspect may be summarized in a non-limiting example as follows:

In a first step the patient's imaging data is analyzed. Medical images, anatomical atlas segmentation, indication-specific and procedure-specific information acquired from hospital computer systems is analyzed. The following sample attributes are deduced from the information:

From indication and procedure, the body part to be operated is identified (e.g. spine).

From patient administrative data, the length and weight of the patient is identified.

From imaging data, anatomical atlas and length/weight, a surface model of the patient is generated.

From imaging data, anatomical atlas, body part and procedure information, the exact location of the surgery is identified (e.g. a specific spine vertebra).

Based on the above information, a computer device augments a virtual world with:

A 3-dimensional model of the patient surface model that is positioned on top of an operation room (OR) table. Any real flat object would be used to simulate the OR table.

A recommended position for patient positioning is initially used in the display of the patient.

Recommended positions for medical devices and instruments that have image-specific positions outside of the patient's anatomy (e.g. Mayfield clamp or surgical robot). The positions could be displayed through virtual devices or virtual markers in an augmentation device. The virtual markers define the desired position of the device and/or desired modifications to the device (e.g. Mayfield clamp tightness).

Recommended positions for medical devices and planning objects that have image-specific positions inside the patient's anatomy (e.g. screws in spine surgery).

The recommended positions are marked to indicate most recommended, medium recommended and least recommended areas (e.g. through color or pattern marks).

In a further step the surgeon, a nurse or any other OR staff uses augmented reality glasses (or any other augmentation device) to view the virtual world described above. The world is blended into (augmented) the room currently occupied by the person wearing the glasses. This could be inside the OR or in another room, e.g. surgeon's office.

In a final step, through interaction with the augmentation device, it is possible to modify the position of patient and devices as well as remove, add or correct patient anatomy features and devices.

Alternatively, a real device could be used to modify the patient position. It could be a scale representation of a patient, e.g. a small-scale model of a patient that consists of modifiable arms, legs and head. The different-scale representation of the patient anatomy is seen by the sensors/cameras on the augmentation device and is used to modify the position of the virtual patient on the table.

An individual wearing or interacting with the augmentation device can see and interact with recommended positions of patient and devices in a much more intuitive way than without augmentation. The visualization can augment the OR where the procedure will take place or, alternatively, augment another location different from the OR.

This provides the benefit of image-based automatic suggestions for OR setup. They can be used by OR staff to prepare for surgery. The innovation also enables surgeons to in detail plan and approve OR setups independently of their physical location.

The invention claimed is:

1. A computer-implemented method for generating augmentation information relating to a medical image, using output of an augmented reality device having an output unit for outputting the augmentation information, comprising:

executing, on at least one processor of at least one computer, the steps of:

acquiring patient medical image data which describes a patient image of an anatomical body part of a patient;

acquiring geometric model data which describes a geometric model of at least part of the patient's body;

registering the patient image with the geometric model;

obtaining, using the augmented reality device, a real image of a physical structure corresponding to at least part of: (1) the anatomical body part or the at least part of the patient's body, and (2) a medical device;

outputting augmentation information using the output unit of the augmented reality device based on a result of registering the patient image with the geometric model, the augmentation information including at least a part of the geometric model or at least part of the patient image, overlaid on at least part of the real image acquired using the augmented reality device, wherein the output unit of the augmented reality device includes a display for displaying the augmentation information, wherein the augmented reality device includes a head-mounted distance measurement unit having a light source for emitting measurement light onto the physical structure to measure a distance between the augmented reality device and the physical structure, and wherein at least the part of the geometric model or at least part of the patient image describing at least part of the anatomical body part is registered, based on the measured distance between the augmented reality device and the physical structure, with the real image acquired using the augmented reality device; and determining, based on at least the part of the geometric model or at least part of the patient image describing at least part of the anatomical body part being registered with the real image of the physical structure, control data for controlling the medical device for changing the position of the physical structure to comply with a position of the physical structure defined by the augmentation information.

2. The method according to claim 1 wherein the geometric model data is acquired from an image-based atlas data, describing the at least part of the patient's body or from a generic geometric model of the at least part of the patient's body, or from an individual synthetic template describing a synthesized geometric model of the at least part of the patient's body.

3. The method according to claim 1 wherein the geometric model comprises a model of at least part of the anatomical body part, or wherein the geometric model does not comprise a model of the anatomical body part.

4. The method according to claim 1 wherein the patient image is registered with the geometric model by establishing a positional mapping between a patient image coordinate system in which image coordinates of the patient image are defined and a model coordinate system in which positions of the geometric model are defined by applying an image fusion algorithm to the patient image and the geometric model.

5. The method according to claim 1 wherein the augmentation information describes at least part of a geometric model of at least part of the anatomical body part.

6. The method according to claim 1 wherein the display of the augmented reality device is configured to output augmentation information as an overlay on the real image acquired using the augmented reality device.

7. The method according to claim 1 wherein the physical structure includes a shape representative of the at least part of the patient's body.

8. The method according to claim 7 wherein the physical structure is positionally tracked using a result of distance measurements by the head-mounted distance measurement unit of the augmented reality device, and wherein the registration between the at least one of at least part of the geometric model or at least part of the anatomical body part with the physical structure is used to determine, based on the result of the positional tracking, the position of at least part of the at least one of at least part of the geometric model or at least part of the anatomical body part in a coordinate system used by the augmented reality device to output image information describing the at least one of at least part of the geometric model or at least part of the anatomical body part.

9. The method according to claim 1 wherein the physical structure is positionally tracked using a result of distance measurements by the head-mounted distance measurement unit of the augmented reality device, and wherein the registration between the at least one of at least part of the geometric model or at least part of the anatomical body part with the physical structure is used to determine, based on the result of the positional tracking, control data for controlling movement of at least part of the physical structure.

10. The method according to claim 1 further comprising:
acquiring medical procedure data which describes an envisaged medical procedure to be carried out on the patient;
acquiring device control data describing a control parameter of the medical device based on the medical procedure data;
outputting augmentation information corresponding to the device control data by the augmented reality device.

11. A non-transitory computer-readable storage medium for generating augmentation information relating to a medical image, using output of an augmented reality device having an output unit for outputting the augmentation information, comprising instructions, which when executed by at least one processor causes the at least one processor to:
acquire patient medical image data which describes a patient image of an anatomical body part of the patient;
acquire geometric model data which describes a geometric model of at least part of the patient's body;
register the patient image with the geometric model;
obtain, using the augmented reality device, a real image of a physical structure corresponding to at least part of: (1) the anatomical body part or the at least part of the patient's body, and (2) a medical device;
output augmentation information using the output unit of the augmented reality device based on a result of registering the patient image with the geometric model, the augmentation information including at least a part of the geometric model or at least part of the patient image, overlaid on at least part of the real image acquired using the augmented reality device,
wherein the output unit of the augmented reality device includes a display for displaying the augmentation information,
wherein the augmented reality device includes a head-mounted distance measurement unit having a light source for emitting measurement light onto the physical structure to measure a distance between the augmented reality device and the physical structure, and
wherein at least the part of the geometric model or at least part of the patient image describing at least part of the anatomical body part is registered, based on the measured distance between the augmented reality device and the physical structure, with the real image acquired using the augmented reality device; and
determine, based on at least the part of the geometric model or at least part of the patient image describing at least part of the anatomical body part being registered with the real image of the physical structure, control data for controlling the medical device for changing the position of the physical structure to comply with a position of the physical structure defined by the augmentation information.

12. A medical system for generating augmentation information relating to a medical image, using output of an augmented reality device having an output unit for outputting the augmentation information, the medical system comprising:
at least one computer having at least one processor with associated memory, the memory storing instructions which when executed, cause the at least one processor to:
acquire patient medical image data which describes a patient image of an anatomical body part of the patient;
acquire geometric model data which describes a geometric model of at least part of the patient's body;
register the patient image with the geometric model;

obtain, using the augmented reality device, a real image of a physical structure corresponding to at least part of: (1) the anatomical body part or the at least part of the patient's body, and (2) a medical device;

output augmentation information using the output unit of the augmented reality device based on a result of registering the patient image with the geometric model, the augmentation information including at least a part of the geometric model or at least part of the patient image, overlaid on at least part of the real image acquired using the augmented reality device, wherein the output unit of the augmented reality device includes a display for displaying the augmentation information, wherein the augmented reality device includes a head-mounted distance measurement unit having a light source for emitting measurement light onto the physical structure to measure a distance between the augmented reality device and the physical structure, and wherein at least the part of the geometric model or at least part of the patient image describing at least part of the anatomical body part is registered, based on the measured distance between the augmented reality device and the physical structure, with the real image acquired using the augmented reality device; and determining, based on at least the part of the geometric model or at least part of the patient image describing at least part of the anatomical body part being registered with the real image of the physical structure, control data for controlling the medical device for changing the position of the physical structure to comply with a position of the physical structure defined by the augmentation information.

* * * * *